(12) United States Patent
Singamneni et al.

(10) Patent No.: US 9,386,580 B2
(45) Date of Patent: *Jul. 5, 2016

(54) COMMUNICATING WITH MULTIPLE DEVICES

(71) Applicant: BROADCOM CORPORATION, Irvine, CA (US)

(72) Inventors: Ravindranath Singamneni, San Diego, CA (US); Erik J. Rivard, San Diego, CA (US); Siwei Tang, San Diego, CA (US); Long Wang, San Diego, CA (US)

(73) Assignee: Broadcom Corporation, Irvine, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/715,449

(22) Filed: May 18, 2015

(65) Prior Publication Data
US 2015/0249988 A1    Sep. 3, 2015

Related U.S. Application Data

(60) Continuation of application No. 13/886,614, filed on May 3, 2013, now Pat. No. 9,066,345, which is a division of application No. 12/771,896, filed on Apr. 30, 2010, now Pat. No. 8,457,097.

(51) Int. Cl.
*H04W 72/04* (2009.01)
*H04W 56/00* (2009.01)
(Continued)

(52) U.S. Cl.
CPC ............ *H04W 72/0446* (2013.01); *H04L 1/12* (2013.01); *H04W 56/001* (2013.01); *H04W 56/0015* (2013.01); *H04W 72/082* (2013.01)

(58) Field of Classification Search
None
See application file for complete search history.

(56) References Cited

U.S. PATENT DOCUMENTS

| | | | |
|---|---|---|---|
| 8,155,695 B2 | 4/2012 | Wang et al. | |
| 2001/0010689 A1* | 8/2001 | Awater | H04W 16/14 370/344 |
| 2004/0242159 A1* | 12/2004 | Calderon | H04W 16/14 455/63.3 |

(Continued)

OTHER PUBLICATIONS

Bluetooth, "Specification of the Bluetooth System—Experience More", Bluetooth Specification Version 4.0 [vol. 0], Jun. 30, 2010, 2302 pgs.

(Continued)

*Primary Examiner* — Eunsook Choi
(74) *Attorney, Agent, or Firm* — McDermott Will & Emery LLP

(57) ABSTRACT

A first wireless node may determine that a first reserved retransmission frame overlaps with a second reserved transmission frame and a second reserved retransmission frame and that the second reserved transmission frame overlaps with a first reserved transmission frame and the first reserved retransmission frame. The first reserved transmission frame and the first reserved retransmission frame may be reserved for wireless communication with a first master node, and the second reserved transmission frame and the second reserved retransmission frame are reserved for wireless communication with a second master node. The wireless node may also process and acknowledge data received from the first master node during the first reserved transmission frame based on the determining, ignore data sent by the second master node during the second reserved transmission frame based on the determining, and process and acknowledge data received from the second master node during the second reserved retransmission frame.

20 Claims, 9 Drawing Sheets

(51) Int. Cl.
*H04L 1/12* (2006.01)
*H04W 72/08* (2009.01)

(56) References Cited

U.S. PATENT DOCUMENTS

| | | |
|---|---|---|
| 2005/0136835 A1 | 6/2005 | Suwa |
| 2006/0092894 A1 | 5/2006 | Amano |
| 2006/0183423 A1 | 8/2006 | Johansson et al. |
| 2006/0205401 A1* | 9/2006 | Palin ............... H04M 1/2535 455/425 |
| 2006/0246932 A1 | 11/2006 | Liang |
| 2007/0281617 A1 | 12/2007 | Meylan et al. |
| 2008/0102843 A1 | 5/2008 | Todd et al. |
| 2009/0137206 A1 | 5/2009 | Sherman et al. |
| 2009/0163145 A1 | 6/2009 | Xhafa et al. |
| 2009/0318087 A1 | 12/2009 | Mattila et al. |
| 2010/0112950 A1 | 5/2010 | Haartsen et al. |
| 2010/0203832 A1 | 8/2010 | Russell et al. |
| 2010/0284273 A1* | 11/2010 | Haartsen ............... H04L 47/10 370/230 |
| 2011/0066746 A1 | 3/2011 | Bennett et al. |
| 2011/0268020 A1 | 11/2011 | Singamneni et al. |
| 2014/0050204 A1 | 2/2014 | Huang et al. |

OTHER PUBLICATIONS

Bluetooth, "Specification of the Bluetooth System—Wireless Connections Made Easy", Bluetooth Specification Version 3.0—HS [vol. 0], Apr. 21, 2009, 1712 pgs.

Bluetooth, "Specification of the Bluetooth System—Wireless Connections Made Easy", Bluetooth Core Specification Addendum 1, Jun. 26, 2008, 176 pgs.

Bluetooth, "Specification of the Bluetooth System—Wireless Connection Made Easy", bluetooth Specification Version 2.1 + EDR, Jul. 26, 2007, 1420 pgs.

Bluetooth, "Specification of the Bluetooth System—Wireless Connections Made Easy", Bluetooth Specification Version 2.0 + EDR [vol. 0], Nov. 4, 2004, 1230 pgs.

Bluetooth, "Specification of the Bluetooth System—Wireless Connections Made Easy", Bluetooth Specification [vol. 4], Jan. 1, 2006, 74 pgs.

Bluetooth, "Advanced Audio Distribution Profile Specification", Audio Video WG, Version 12, Apr. 16, 2007, 71 pgs.

Bluetooth, "Advanced Audio Distribution Profile Specification", Confidential—Bluetooth Audio Video Working Group, Adopted Version 1.0, May 22, 2003, 75 pgs.

Bluetooth, "Audio/Video Remote Control Profile", Audio Video WG (AVRCP), Version 14, Jun. 26, 2008, 166 pgs.

Bluetooth, "Audio/Video Remote Control Profile", Bluetooth Specification Audio/Video Remote Control Profile (AVRCP), vol. 13, Apr. 16, 2007, 93 pgs.

Bluetooth, "Audio/Video Remote Control Profile", Confidential—Bluetooth Audio Video Working Group, Version 1.0 Adopted, May 22, 2003, 52 pgs.

"Basic Imaging Profile—Interoperability Specification", Confidential—Bluetooth SIG, Jul. 25, 2003, 99 pgs.

Bluetooth, "Basic Printing Profile", Adopted—Printing Working Group, Version 12, Apr. 27, 2006, 127 pgs.

Bluetooth, "Basic Printing Profile", Confidential—Printing Working Group, Version 10, Feb. 10, 2005, 134 pgs.

Bluetooth, "Cordless Telephony Profile", Bluetooth Specification Version 1.1, Feb. 22, 2001, 46 pgs.

* cited by examiner

US 9,386,580 B2

COMMUNICATING WITH MULTIPLE DEVICES

CROSS-REFERENCE TO RELATED APPLICATION

This application is a continuation of U.S. patent application Ser. No. 13/886,614, entitled "Communicating With Two Nodes With Overlapping Frames," filed on May 3, 2013, now issued as U.S. Pat. No. 9,066,345, which is a divisional application of U.S. patent application Ser. No. 12/771,896, entitled "Communicating With Two Nodes With Overlapping Frames," filed on Apr. 30, 2010, now issued as U.S. Pat. No. 8,457,097, both of which are hereby incorporated by reference in their entireties for all purposes.

TECHNICAL FIELD

This description relates to wireless networking.

BACKGROUND

In wireless communication, a single wireless device or node may communicate with two or more wireless devices or nodes. Transmissions between the wireless nodes may interfere with each other, reducing throughput of the data. It may be desirable to reduce interference of transmissions between the wireless nodes.

DETAILED DESCRIPTION

Figure 1:
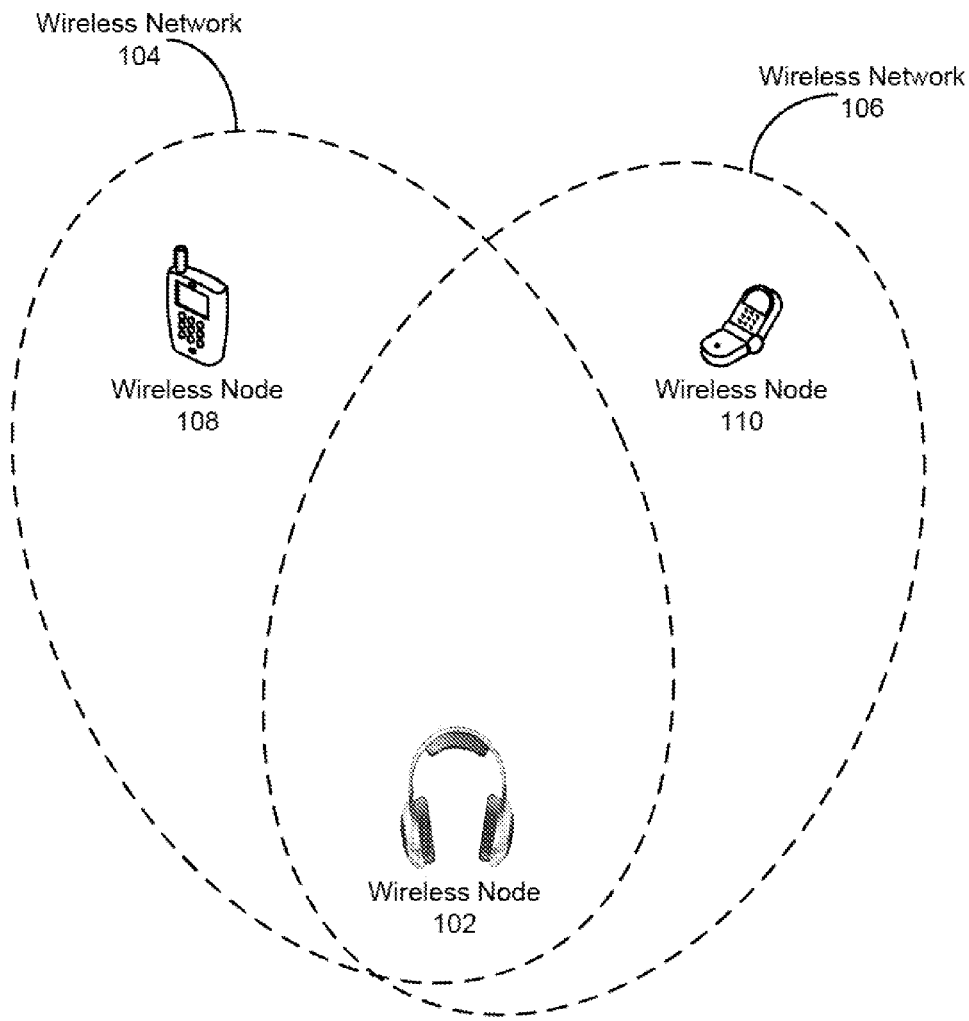
FIG. 1 is a diagram showing a wireless node in two wireless networks according to an example embodiment.

FIG. 1 is a diagram showing a wireless node 102 in wireless networks 104, 106 according to an example embodiment. The wireless node 102 may include, for example, an IEEE 802.15 Bluetooth device or node, an IEEE 802.11 Wi-Fi or WLAN node, an IEEE 802.16 WiMAX base station, or a cell phone, according to various example embodiments. While the terminology of Bluetooth is used herein, this disclosure may be applied to any other wireless networking technologies, or even wired or guided technologies in which a shared transmission medium is utilized by at least three devices.

In the example shown in FIG. 1, the first wireless node 102 may be part of a first wireless network 104 which is shared with the second wireless node 108. The wireless node 102 may also be part of a second wireless network 106 which is shared with the third wireless node 110. The first wireless node 102 may communicate time-sensitive traffic and/or data such as, for example, voice traffic or data to and/or from each of the other wireless nodes 108, 110. The time-sensitivity of the traffic or data may make it unfeasible to retransmit data which are not accurately received, unless the data are retransmitted immediately after the transmission. The wireless node 102 may be wirelessly paired or coupled with each of the wireless nodes 108, 110. The pairing of the wireless node 102 with each of the wireless nodes 108, 110 in the wireless networks 104, 106, respectively, is described in greater detail with respect to FIGS. 3A, 3B, 3C below.

In establishing the pairing and/or the negotiation with either or both of the wireless nodes 108, 110 in the wireless networks 104, 106 respectively, the wireless nodes 102, 108, 110 may establish which node 102, 108, 110 is the master of the respective network 104, 106 and which node 102, 108, 110 is a slave of the respective wireless network 104, 106. In each of the wireless networks 104, 106, one node 102, 108, 110 may be considered the master and one or more nodes may be considered a slave. Each network 104, 106 may have one master, and anywhere between one and seven slaves in a Bluetooth example, or any number of slaves, according to example embodiments. A node 102, 108, 110 may be a master in zero or one networks, but may not be master in more than one network 104, 106. A node 102, 108, 110 may be a slave in any number of networks 104, 106, or up to eight networks according to example embodiments. While only two nodes 102, 108, 110 are shown in each of the wireless networks 104, 106 shown in FIG. 1, any number, such as between two and eight, wireless nodes 102, 108, 110 may be included in the wireless networks 104, 106, according to example embodiments.

In each of the wireless networks 104, 106, the master may control the timing of transmissions within the network 104, 106. The networks 104, 106 may, for example, utilize time division duplexing or time division multiplexing to control when data is sent or received within frames. Data or frames sent from a master to a slave may be considered downlink transmissions, whereas data or frames sent from a slave to the master of a respective network 104, 106 may be considered uplink transmissions. The master of the respective network 104, 106 may determine the timing of the respective network 104, 106 by sending preambles which may be at the beginning of downlink frames sent by the master. The slaves within the network 104, 106 may listen for the preambles and time their listening for, and sending of, frames accordingly. If a slave within a network determines that a frame is not destined for the slave, based, for example, on a destination address included in the frame not matching the address of the slave, the slave may sleep or power down for the remainder of the frame, and wake up or power on when the next frame is expected. At times, the phases, clocks, or synchronizations of the masters within respective networks 104, 106 may shift which may cause frames or slots sent within one network 104, 106 to interfere with two frames or slots in the other network 104, 106.

The wireless nodes 102, 108, 110 may utilize acknowledgements to demonstrate that frames and/or transmissions were correctly received. For example, the slaves, upon successfully receiving a downlink transmission from their respective master during a downlink slot, may send an acknowledgement during the following uplink slot. In an example embodiment, frames may include two slots: a downlink slot during which the master may send data to a slave within the network 104, 106 and an uplink slot during which the slave to which the proceeding downlink slot was directed may send data to the master of its network 104, 106.

In synchronous connection (SCO), the master of a network 104, 106 may dedicate or reserve periodic frames and/or slots for certain slaves. In SCO, the master may dedicate periodic frames to a certain slave within the network 104, 106. For example, the master may dedicate or reserve every third frame to a particular slave. If every third frame is dedicated to a particular slave, then that slave will always be able to receive and/or transmit during a dedicated or reserved frame. This gives priority to that slave guaranteeing a certain amount of bandwidth or data transmission. If a slave has frames dedicated or reserved for the slave, the slave may sleep or power down during transmission of other frames, and wake up or power on only when the dedicated or reserved frames are scheduled, saving power.

The wireless nodes 102, 108, 110 may utilize extended synchronous connection (eSCO), which may allow the nodes 102, 108, 110 to retransmit frames (or data included therein) which were not successfully received and/or acknowledged. In eSCO, the master of a particular network 104, 106 may also dedicate and/or reserve retransmission frames for a particular slave. In eSCO, the master and/or slave may also have the capability of dedicating retransmission frames to a particular slave or reserving retransmission frames to a slave. When frames are reserved for retransmission, if the master does not receive an acknowledgment in an uplink slot subsequent to a downlink slot within a frame during which the master sent a transmission to the slave for which the frame is reserved, then the master may retransmit the data during the subsequent reserved retransmission frame. The retransmission frame may be directly after the reserved transmission frame. The master and slave may negotiate a certain number of reserved retransmission frames, such as 0, 1, or 2, which will follow the reserved transmission frames. The master will retransmit the data during the reserved transmission frames and/or reserved downlink retransmission slots until the master receives an acknowledgment from the slave for which the transmission and retransmission slots and/or frames are reserved, or until all of the reserved retransmission frames and/or slots have been exhausted.

Figure 2:
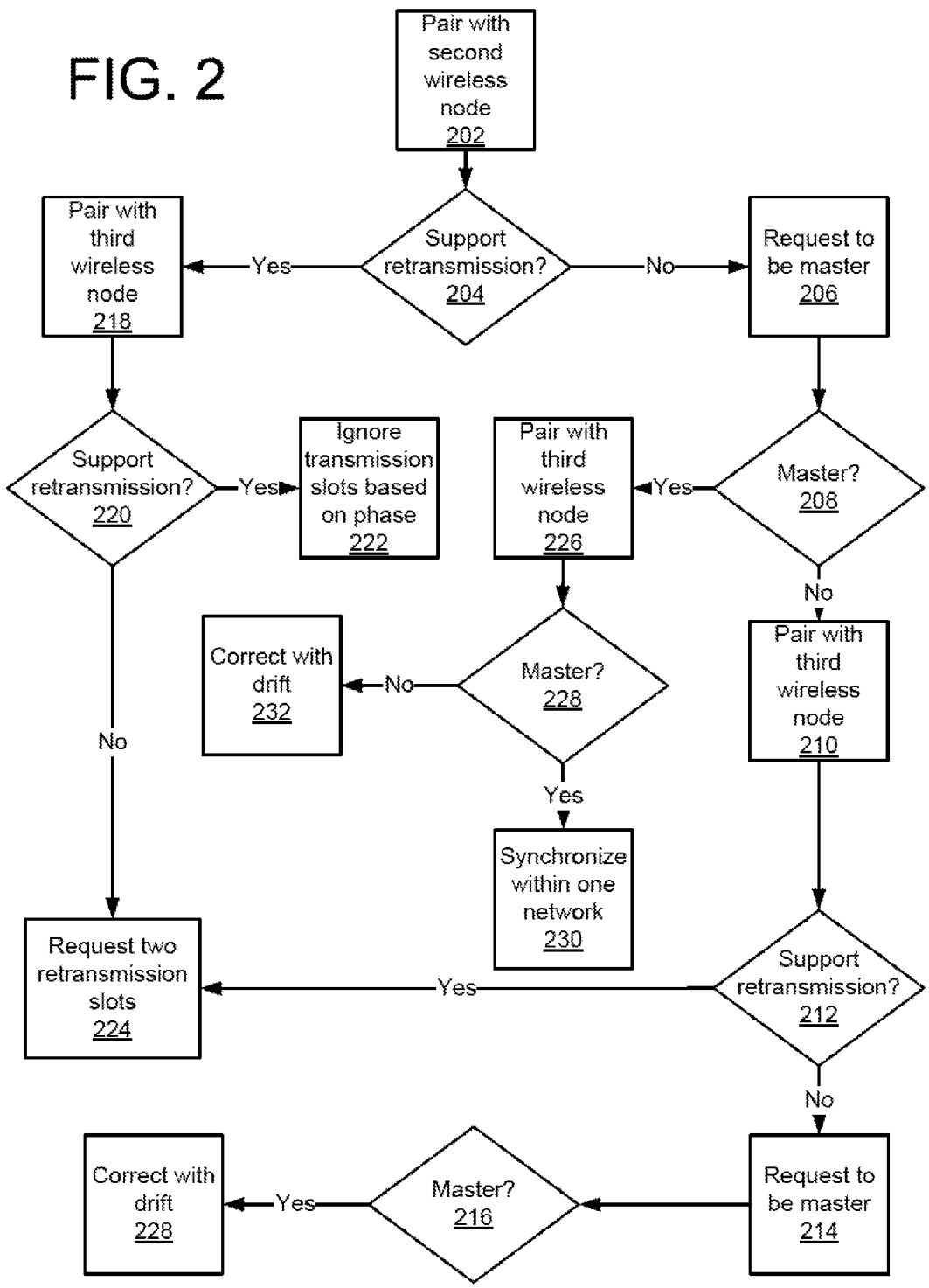
FIG. 2 is a flowchart showing processes and decisions performed by the wireless node included in both of the wireless networks shown in FIG. 1 according to an example embodiment.

FIG. 2 is a flowchart showing decisions and actions which may be performed by a wireless node such as the wireless node 102 shown in FIG. 1. In the example shown in FIG. 2, the node 102 may pair with the second wireless node 108 (202). During the pairing of the wireless node 102 with the second wireless node 108, the first wireless node 102 may determine whether the second wireless node 108 supports retransmission (204). The first wireless node 102 may determine whether the second wireless node 108 supports retransmission based, for example on an indication by the second wireless node 108 of whether the second wireless node supports eSCO.

After determining whether the second wireless node 108 supports retransmission, the first wireless node 102 may negotiate reservation parameters with the second wireless node 108. The reservation parameters may include whether any transmission frames will be reserved for the node 102, 108 which becomes the slave, and/or whether retransmission frames will be reserved for the node 102, 108 which becomes the slave. The negotiation of the reservation parameters may also take place after a determination of which node 102, 108 will be the master and which node 102, 108 will be the slave, or after some communications between the nodes has occurred, according to example embodiments.

Reservation parameters may include, for example, a period over which frames will be allocated such as, for example, frames being grouped in blocks of six, which frames and/or slots will be reserved for the slave, and whether or how many retransmission frames or slots (after the reserved frames and/or slots) will be reserved for the slave. For example, the master and slave may negotiate a period or number of frames in a block, such as six, and which frame number among that block will be reserved for the slave. If, for example, the master and slave agreed that the period of the block would be six frames, and that one of the frames, such as frame number 0, 1, 2, 3, 4, or 5, would be reserved to the slave, then one out of every six frames would be reserved for the slave. Any other number of frames within a block may be agreed upon, but the number of frames within a block must be the same throughout the given network 104, 106. Also, within each network each frame may be reserved for only one slave.

The above applies to negotiations where both the master and slave within a given network 104, 106 support SCO, and/or where at least one of the master and slave in the given network 104, 106 does not support eSCO or retransmission. In an example in which both of the master and slave within a given network 104, 106 support eSCO or retransmission, the master and slave may also negotiate how many retransmission frames will be reserved for the slave after the reserved frame. The master and slave may negotiate a number, such as 0, 1, or 2, of retransmission frames which will be reserved for the slave after the reserved transmission frame.

Figure 3A:
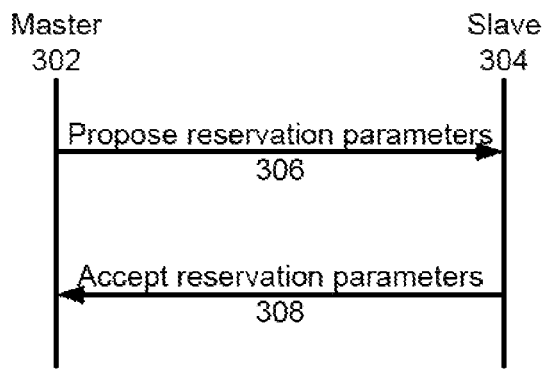
FIG. 3A is a vertical time-sequence diagram showing negotiation of reservation parameters according to an example embodiment.
Figure 3B:
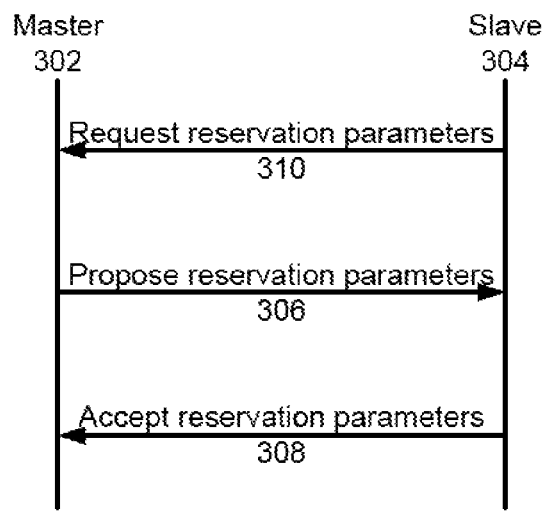
FIG. 3B is a vertical time-sequence diagram showing negotiation of reservation parameters according to another example embodiment.
Figure 3C:
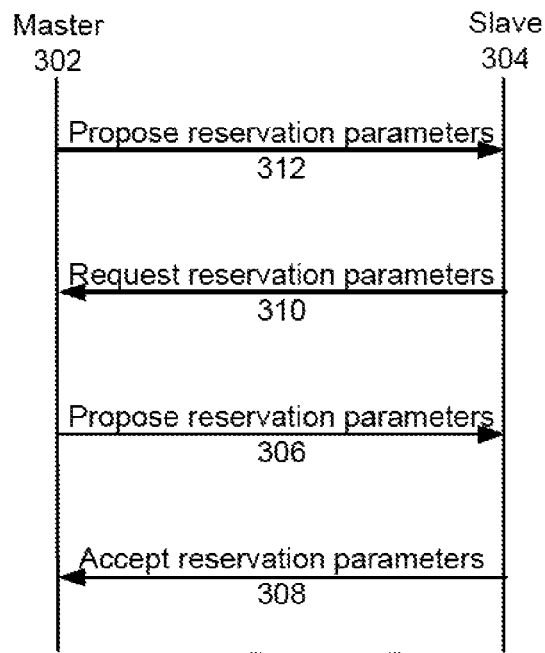
FIG. 3C is a vertical time-sequence diagram showing negotiation of reservation parameters according to another example embodiment.

FIGS. 3A, 3B, and 3C show examples of negotiating these reservation patterns between the master 302 and the slave 304. While FIGS. 3A, 3B, and 3C describe negotiations with reference to the master 302 and the slave 304, these negotiations may also take place between nodes 102, 108, 110 before the nodes 102, 108, 110 have determined which is the master and which is the slave.

In the example shown in FIG. 3A, the master 302 may initiate and propose reservation parameters (306) to the slave 304. The master 302 may, for example, propose a period or number of frames within the block, a reservation number for a reserved transmission for the slave 304, and a number of retransmission frames (which may each include a master-to-slave downlink slot and a slave-to-master uplink slot) which will follow the reserved transmission frame for the slave 304. If the slave 304 is satisfied with the proposed reservation parameters, the slave 304 may send and accept reservation parameters message 308 to the master 302, at which point the negotiation will be complete.

FIG. 3B shows an example of negotiating reservation parameters in which the slave 304 initiates the negotiation. In this example, the slave 304 may request reservation parameters 310 to the master 302. The requested reservation parameters may include, for example, the period or number of frames within a block, the reserved transmission slot or frame, and/or the number of reserved retransmission frames or slots. In response to receiving the request reservations message 310 from the slave 304, the master 302 may send a proposed reservations parameter message 306 to the slave 304. If the master 302 agrees with the requested reservation parameters included in the message 310 sent by the slave, then the proposed reservation parameters message 306 may include the same reservation parameters as the request reservation parameters message 310 sent by the slave 304 to the master 302. If the master 302 does not agree to the requested reservation parameters, then the proposed reservation parameters message 306 may include different reservation parameters then the reservation parameters included in the request reservation parameters message 310. In response to receiving the proposed reservation parameters message 306 from the master 302, the slave 304 may send an accept reservation parameters message 308 to the master 302, accepting the reservation parameters included in the proposed reservation parameters message 306.

FIG. 3C shows an example of negotiation over reservation parameters in which the slave 304 requests different parameters than those initially proposed by the master 302. In this example, the master 302 may initiate the negotiation over reservation parameters by sending a proposed reservation parameters message 312 to the slave 304. In this example, the slave 304 wants to have different reservation parameters than those included in the proposed reservation parameters message 312. The slave 304 will, because it requests different reservation parameters than those included in the proposed reservation parameters message 312, send a request reservation parameter message 310 to the master 302. The request reservation parameters message 310 may include different reservation parameters than the reservation parameters included in the proposed reservation parameters message 312 sent by the master 302. The master 302 may receive the request reservation parameters message 310 and determine whether the master 302 can accommodate the reservation parameters included in the request reservation parameters message 310. The master 302 may respond to the request reservation parameters message 310 by sending a proposed reservation parameters message 306 to the slave 304. If the master 302 is able to accommodate the reservation parameters included in the request reservation parameters message 310, then the proposed reservation parameters message 306 may include the same reservation parameters as the request reservation parameters message 310. If the master 302 is not able to accommodate the reservation parameters included in the request reservation parameters message 310, then the proposed reservation parameters message 306 may include different reservation parameters then the reservation parameters included in the request reservation parameters message 310 and may include the same parameters included in the proposed reservation parameters message 312. In response to receiving the proposed reservation parameters message 306, the slave 304 may send an accept reservation parameters message 308 to the master 302, accepting the proposed reservation parameters included in the proposed reservation parameters message 306.

Returning to FIG. 2, if the first wireless node 102 determines that the second wireless node 108 does not support retransmission, then the first wireless node 102 may request to be the master of the wireless network 104 shared with the wireless node 108 (206). Becoming the master of the wireless network 104 may allow the first wireless node 102 to determine timing and/or synchronization of transmissions, such as by controlling the frames and/or slots within the wireless network 104. A determination may be made whether the second wireless node 108 allowed the first wireless node 102 to be the master of the first wireless network 104 (208).

After the determination of whether the first wireless node 102 may be the master within the first wireless network 104, the wireless node 102 may engage in data transmission and/or communication with the wireless node 108. The data transmission and/or communication may utilize frames which each include two slots, namely, a master-to-slave downlink transmission slot followed by a slave-to-master uplink transmission slot.

Figures 4, 5:
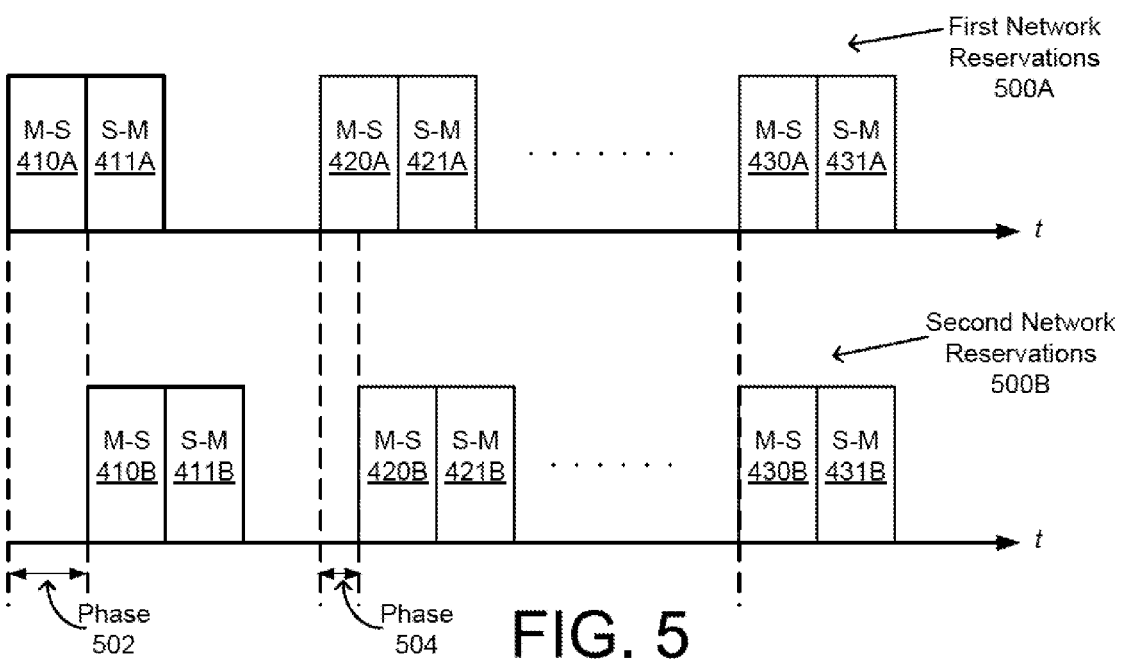
FIG. 4 is a diagram showing slot reservations within the first wireless network and the second wireless network according to an example embodiment.
FIG. 5 is a diagram showing the wireless node reduce interference between the first wireless network and the second wireless network by drifting synchronization according to an example embodiment.

FIG. 4 is a diagram showing slots and/or frames within the first wireless network 104 and the second wireless network 106 according to an example embodiment. The slots and frames 400A at the top of FIG. 4 may be used for communication in the first wireless network 104, and the slots and frames 400B at the bottom of FIG. 4 may be used for communication in the second wireless network 106. A frame may include a pair of slots, such as the master-to-slave downlink transmission or retransmission slot 410A, 410B, paired with a slave-to-master or uplink transmission or retransmission slot 411A, 411B.

In the master-to-slave or downlink transmission slots 410A, 412A, 414A, 420A, 422A, 424A, 410B, 412B, 414B, 420B, 422B, 424B included in the first half of each frame, the master may send the beacon or preamble, which may be used by the slaves within the respective network 104, 106 to synchronize to the master. The master-to-slave or downlink slot 410A, 412A, 414A, 420A, 422A, 424A, 410B, 412B, 414B, 420B, 422B, 424B may also include a destination address identifying the wireless node 102, 108, 110 which is the slave and which is the intended recipient of the data included in the master-to-slave or downlink slot 410A, 412A, 414A, 420A, 422A, 424A, 410B, 412B, 414B, 420B, 422B, 424B. If the destination address does not identify a listening slave, then the slave may sleep or power down until the remainder of the frame, waking or power on to listen to the next frame, which will begin with the next master-to-slave downlink slot 412A, 414A, 420A, 422A, 424A, 410B, 412B, 414B, 420B, 422B, 424B. The master-to-slave or downlink slot 410A, 412A, 414A, 420A, 422A, 424A, 410B, 412B, 414B, 420B, 422B, 424B may also include any data intended for the slave to which the downlink or master-to-slave slot 410A, 412A, 414A, 420A, 422A, 424A, 410B, 412B, 414B, 420B, 422B, 424B is addressed or destined. The subsequent slave-to-master or uplink slot 411A, 413A, 415A, 421A, 423A, 425A, 411B 413B, 415B, 421B, 423B, 425B may be allocated or assigned to the slave which was identified in the preceding master-to-slave or downlink slot 410A, 412A, 414A, 420A, 422A, 424A, 410B, 412B, 414B, 420B, 422B, 424B. In an example in which some of the frames were reserved for a particular slave, some of the frames (and the slots included therein) may automatically be reserved and dedicated to a particular slave. For example, if each block or period included 3 frames and/or 6 slots, then if the '0' frame was reserved for the slave in the first wireless network 104, then the slots 410A, 411A, 420A, 421A may be reserved for the slave in the first wireless network 104. A slave for which some frames are dedicated or reserved may sleep or power down during other frames, and wake up or power on only when the frames dedicated or reserved for that slave are scheduled for transmission, thereby saving power, according to an example embodiment.

In an eSCO example, the downlink transmissions from the master to the slave which are successfully received by the slave may be acknowledged by the slave. For example, if the data included in the master-to-slave downlink slot 410A was successfully received by the slave, then the slave may acknowledge the successful receipt of the transmission in the subsequent slave-to-master uplink slot 411A. Similarly, if the data transmitted to the slave in the master-to-slave downlink slot 420A was successfully received by the slave, then the slave may acknowledge the successful receipt in the slave-to-master uplink slot 421A. If either the master or the slave does not support retransmission, such as if either the master of the slave supports SCO but not eSCO, then frames which are not acknowledged may not be retransmitted, which may be due to the time sensitivity of the data.

In an example in which retransmission is supported, such as when both the master and slave support eSCO, certain frames, and the slots included therein, may be reserved for retransmission. The frames reserved for retransmission may immediately follow the frames reserved for transmission. For example, if the frames which include the slots 410A, 411A, 420A, 421A are reserved for transmission, and one frame is reserved for retransmission between the first wireless node 102 and the second wireless node 108 within the first wireless network 104, then the frames which include the slots 412A, 413A may be reserved for retransmission in case the data included in the master-to-slave downlink slot 410A is not acknowledged by the slave as being successfully received during the slave-to-master uplink slot 411A, and the frame which includes slots 422A, 423A may be reserved for retransmission of data which is not acknowledged by the slave as being successfully received during the frame which include slots 420A, 421A.

For example, if the data sent by the master in the master-to-slave downlink slot 410A is acknowledged in the slave-to-master uplink slot 411A, then the data may not be retransmitted in the subsequent master-to-slave downlink slot 412A, and the frame which includes slots 412A, 413A may not be used. However, if the slave does not acknowledge the data sent in the master-to-slave downlink slot 410A during the slave-to-master uplink slot 411A (or the master does not receive the acknowledgment), then the master may retransmit the same data during the subsequent master-to-slave downlink slot 412A. If the slave successfully receives the data during the subsequent master-to-slave downlink slot 412A, then the slave may acknowledge successful receipt during the slave-to-master uplink slot 413A. However, if the data is not successfully received during either the master-to-slave downlink slot 410A or the master-to-slave downlink slot 412A, then the data may not be retransmitted in the case in which one frame was reserved for retransmission after each reserved transmission frame.

In an example in which two frames are reserved for retransmission for each frame reserved for transmission, then the frames which include the slots 412A, 413A, 414A, 415A may be reserved for retransmission of data sent in slots 410A and 411A, and slots 422A, 423A, 424A, 425A may be reserved for retransmission of data transmitted in the frame which includes slots 420A and 421A. For example, if the master sends data during the master-to-slave downlink slot 410A, but the slave does not acknowledge successful receipt of the data during the slave-to-master uplink slot 411A (or the master does not receive the acknowledgment), then the master may retransmit the data during the subsequent master-to-slave downlink slot 412A. If the slave still does not acknowledge successful receipt of the data during the subsequent slave-to-master uplink slot 413A (or the master does not receive the acknowledgment), then the master may retransmit the data one last time during the second subsequent master-to-slave downlink slot 414A. If the slave successfully receives the data during the second subsequent master-to-slave downlink slot 414A, then the slave may acknowledge successful receipt of the data during the second subsequent slave-to-master uplink slot 415A. However, if the slave does not acknowledge successful receipt of the data during the second subsequent slave-to-master uplink slot 415A, then the master may not retransmit the data which was initially sent during the master-to-slave downlink slot 410A and was retransmitted during the subsequent master-to-slave downlink slots 412A, 414A. While transmission and retransmission have been described with reference to the slots 400A in the first wireless network 104, the techniques are equally applicable to the second wireless network 106.

Returning to FIG. 2, the wireless node 102 may pair with the third wireless node 110. If the first wireless node 102 was not able to become the master of the first wireless network 104, then the first wireless node 102 may follow pairing with the third wireless node 110 (210) by determining whether the third wireless node 110 supports retransmission (212). The first wireless node 102 may determine whether the third wireless node 110 supports retransmission of data during negotiation and/or pairing with the third wireless node 110. If the third wireless node 110 does not support retransmission, then the first wireless node 102 may request to be the master of the second wireless network 106 (214).

If the phases of the communications within the first network 104 and the second network 106 drift and/or have a phase shift or are out of phase, this may cause one frame or slot of one of the networks 104, 106 to interfere with two of the frames or slots of the other network 104, 106. Whether the first wireless node 102 is able to correct this phase difference or phase drift depends on whether the third wireless node 110 allowed the first wireless node 102 to be the master (216) of the second wireless network 106. The first wireless node 102 may have attempted to become the master of the second wireless network 106 during pairing with the third wireless node 110 and/or may have attempted to become the master of the second wireless network 106 after pairing and while communication with the third wireless node 110 were ongoing. If the first wireless node was not able to become the master of either the first wireless network 104 or the second wireless network 106, then the first wireless node 102 may be unable to correct the phase difference or phase drift and communications may be lost. If the first wireless node 102 was able to become the master of either the first wireless network 104 or the second wireless network 106, then the first wireless node 102 may correct the phase difference or the phase drift.

FIG. 5 shows is a diagram showing the first wireless node 102 reduce interference between the first wireless network 102 and the second wireless network 106 according to an example embodiment. In this example, the first wireless node 102 is master of either the second wireless node 108 in the first wireless network 104 or the third wireless node 110 in the second wireless network 106, but is not master of both the second wireless node 108 in the first wireless network 104 and the third wireless node 110 in the second wireless network 106. In this example, the frames at the top of FIG. 5, which include slots 410A, 411A, 420A, 421A, 430A, 431A, may be assigned or reserved within the first wireless network 104, and the frames in the bottom of FIG. 5, which include the slots 410B, 411B, 420B, 421B, 430B, 431B, may be assigned or reserved in the second wireless network 106.

In the example shown in FIG. 5, the communications between the first wireless node 102 and the second wireless node 108 within the first wireless network 104 may not be synchronized, and/or may be out of phase with, the communications between the first wireless node 102 and the third wireless node 110 within the second wireless network 110. The communications between the first wireless node 102 and the second wireless node 108 within the first wireless network 104 may be said to lead the communications between the first wireless node 102 and the third wireless node 110 within the second wireless network 106, and/or the communications between the first wireless node 102 and the third wireless node 110 within the second wireless network 106 may be said to lag the communications between the first wireless node 102 and the second wireless node 108 within the first wireless network 104.

The leading of communications the first wireless network 104 is shown in FIG. 5 by the phase shift 502 between the first transmission 410A in the first wireless network 104 before the first transmission 410B in the second wireless network 106. A frame which includes the slots 410A, 411A or 420A, 421A may interfere with a frame which includes the slots 410B, 411B or 420B, 421B, as well as the frame preceding the frame which includes the slots 410B, 411B or 420B, 421B. Similarly, a frame which includes the slots 410B, 411B or 420B, 421B may interfere with a frame which includes the slots 410A, 411A or 420A, 421A, as well as a frame which follows the frame which includes the slots 410A, 411A or 420A, 421A. Thus, each frame in the wireless networks 104, 106 may interfere with two frames in the other wireless network 104, 106.

In an example in which the first wireless node 102 is the master of the third wireless node 110 in the second wireless network 106, the first wireless node 102 may correct the phase difference, lack of synchronization, and/or overlapping of frames by shifting the synchronization or phase of transmissions with the third wireless node 110 within the second wireless network 106. As discussed above, the master of a wireless network may control the synchronization or phase of transmissions by sending a beacon signal, such as a preamble, at the beginning of the master-to-slave downlink slots 410B, 420B, 430B, which serves as a reference point for the slave nodes. The first wireless node 102 may, for example, advance transmissions and/or reduce the period between transmissions with the third wireless node 110 within the second wireless network 106 to reduce the phase shift or phase difference. The first wireless node 102 may shift the phase or synchronization gradually, such as within predetermined phase or synchronization tolerances, to allow communications to continue within the second wireless network 106. As shown in FIG. 5, the shift of the phase will reduce the phase difference from the phase 502 to the phase 504. Eventually, the phase difference will become zero or negligible as shown in the alignment between the frame which includes slots 430A, 431A and the frame which includes slots 430B, 431B.

The wireless node 102 may also correct the synchronization or phase difference by a phase drift if the wireless node 102 is the master in the leading wireless network such, as the first wireless network 104 shown to be leading in the example shown in FIG. 5. In the example in which the first wireless node 102 is the master of the second wireless node 108 in the first wireless network 104, which is leading the second wireless network 106, the first wireless node 102 may delay transmission, such as by increasing the period between transmissions of beacon signals and/or preambles, to correct the phase difference. For example, the first wireless node 102 may delay sending transmissions in the downlink slots 410A, 420A, 430A, such as by sending the transmission in the downlink slot 420A later than normally scheduled, but within predetermined tolerances. Eventually, the transmissions within the first wireless network 104 will be in phase or synchronous with transmissions with the second wireless network 106 as shown by the phase alignment between the slot 430A and the slot 430B. With the phase alignment, each frame sent in the first wireless network 104 will interfere with only one frame sent in the second wireless network 106.

Returning to FIG. 2, if the first wireless node 102 did become the master of the first wireless network 104, the first wireless node 102 may subsequently engage in communication with the second wireless node 108. The first wireless node 102 may later pair with the third wireless node 110 (226). The first wireless node 102 may attempt to become the master of the second wireless network 106. If the communication with the third wireless node 110 within the second wireless network 106 has a phase or synchronization difference with the communication with the second wireless node 108 within the first wireless network 104, which may cause each one frame transmitted in each of the networks 104, 106 to interfere with two frames transmitted in the other network 104, 106, then the first wireless node 102 may correct the phase difference based on whether the first wireless node 102 was able to become the master of the second wireless network 106 (228).

If the first wireless node 102 was able to become the master of the second wireless network 106 either at the time of pairing with the third wireless node 110, or some time after pairing with the third wireless node 110, and the first wireless node 102 is therefore master of both the second wireless node 108 in the first wireless network 104 and the third wireless node 110 in the second wireless network 106, then the first wireless node 102 may correct any phase difference by synchronizing the first wireless network 104 and the second wireless network 106 into one network (230). The first wireless node 102 may, for example, bring both the second wireless node 108 and the third wireless node 110 into a single wireless network or piconet, of which the first wireless node 102 is the master. If the first wireless node 102 is the master of both the second wireless node 108 and the third wireless node 110, then the wireless nodes 102, 108, 110 will be synchronized because all of the nodes 102, 108, 110 will be synchronized by the beacons and/or preambles sent by the first wireless node 102.

If the first wireless node 102 was not able to become the master of the second wireless network 106, then the first wireless node 102 will have become the master of only one of the two wireless networks 104, 106. If the first wireless node 102 is the master of only one of the two wireless networks 104, 106 and there is a synchronization or phase difference between the communication with the wireless nodes 108, 110 within the two wireless networks 104, 106, causing one frame transmitted in one of the networks 104, 106 to interfere with one frame transmitted in the other network 104, 106, then the first wireless node 102 may correct the phase difference between the first wireless network 104 and the second wireless network 106 with a phase drift (232), as discussed above with reference to FIG. 5.

If the first wireless node 102 determined that the second wireless node 108 was able to support retransmission (204), then the first wireless node 102 may engage in communication with the second wireless node 108, as described with reference to FIG. 4, and may thereafter pair with the third wireless node 110 (218). In pairing with the third wireless node 110 in the second wireless network 106, the first wireless node may determine whether the third wireless node 110 supports retransmission (220). If the first wireless node 102 determines that the second wireless node 108 does support retransmission, then the first wireless node 102 and the second wireless node 108 may negotiate reservation parameters.

The first wireless node 102 may determine whether the third wireless node 110 supports retransmission (220). If the third wireless node 110 does support retransmission, such as because the third wireless node 110 is an eSCO wireless node or supports eSCO, then all three of the nodes 102, 108, 110 may support retransmission. In this situation, if the wireless node 102 may determines there is a synchronization or phase difference between the first wireless network 104 and the second wireless network 106, and/or whether one frame in one of the networks 104, 106 overlaps with and/or interferes with two frames in the other network 104, 106, such as because a synchronization or phase of transmitting frames in the first wireless network 104 leads a phase of transmitting frames in the second wireless network 106, then the first wireless node 102 may correct the phase difference by ignoring transmission slots based on the phase or synchronization difference (222). In this situation, in which there is a phase or synchronization difference between the first wireless network 104 and the second wireless network 106, and all of the nodes 102, 108, 110 support retransmission, the first wireless node 102 may accommodate the phase shift by ignoring certain transmission slots, despite being the slave in both wireless networks 104, 106.

Figure 6:
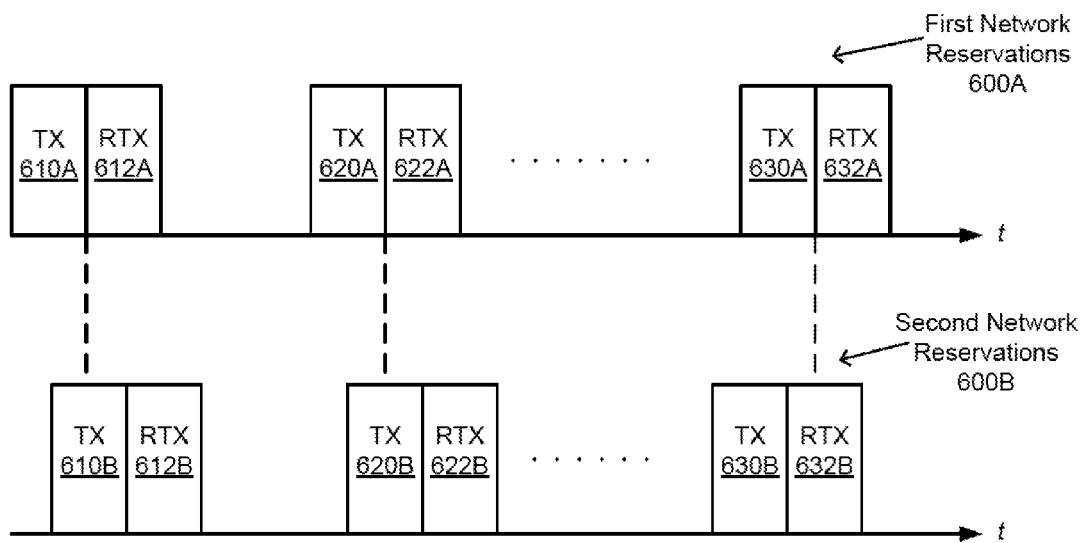
FIG. 6 is a diagram showing reserved transmission and reserved retransmission frames in the first wireless network and the second wireless network according to an example embodiment.

FIG. 6 is a diagram showing reserved transmission and reserved retransmission frames in the first wireless network and the second wireless network according to an example embodiment. In this example, all of the first wireless node 102, second wireless node 108, and third wireless node 110 support reserved retransmission frames. In this example, the first wireless node 102 has negotiated a reserved transmission frame 610A, 620A, 630A and a reserved retransmission frame 612A, 622A, 632A with the second wireless node 108; the first wireless node 102 has also negotiated a reserved transmission frame 610B, 620B, 630B and a reserved retransmission frame 612B, 622B, 632B with the third wireless node 110. Also in this example, the first wireless node 102 may be a slave to the second wireless node 108 in the first wireless network 104, and the first wireless node 102 may be a slave to the third wireless node 110 in the second wireless network 106. Thus, the first wireless node 102, second wireless node 108, and third wireless node 110 may alternatively be referred to as a "slave node," a "first master node," and a "second master node," respectively.

The first wireless node 102 may accommodate transmission in the first wireless network 104 and the second wireless network 106 despite a phase or synchronization difference between the first wireless network 104 and the second wireless network 106 (which causes one frame in each network 104, 106 to interfere with two frames in the other network 104, 106) in the situation in which both the first wireless network 104 and the second wireless network 106 support retransmission. In this example, reserved transmission and retransmission frames 600A on the top of FIG. 6 are reserved within the first wireless network 104, and reserved transmission and retransmission frames 600B for the second wireless network 106 are shown at the bottom of FIG. 6. In this example, only the reserved frames are shown and the slots within the frames may be assumed to be included in the shown frames. Frames which are not reserved in either the first network 104 or the second network 106 are not shown in FIG. 6.

In this example, the wireless nodes 102, 108, 110 have negotiated a reserved transmission frame and a single reserved retransmission frame for each transmission frame in both wireless couplings between the first wireless node 102 and the second wireless node 108, and between the first wireless node 102 and the third wireless node 110. Thus, in the first wireless network, the reserved transmission frame 610A is followed by the reserved retransmission frame 612A, the reserved transmission frame 620A is followed by the reserved retransmission frame 622A, and the reserved transmission frame 630A is followed by the reserved retransmission frame 632A. Similarly, in the second wireless network, the reserved transmission frame 610B is followed by the reserved retransmission frame 612B, the reserved transmission frame 620B is followed by the reserved retransmission frame 622B, and the reserved transmission frame 620B is followed by the reserved retransmission frame 632B.

In the example shown in FIG. 6, the leading of the second wireless network 106 by the first wireless network 104 causes the reserved retransmission frames 612A, 622A of the first network 104 to overlap and/or interfere with both the reserved transmission frames 610B, 620B and the reserved retransmission frames 612B, 622B of the second network 106. Thus, if the wireless node 102 communicates or receives during the reserved retransmission frame 612A, 622A, this may interfere with both the reserved transmission frames 610B, 620B and the reserved retransmission frames 612B, 622B in the second wireless network 106.

Similarly, if the first wireless node 102 communicates with the third wireless node 110 in the second wireless network 106 during the reserved transmission frames 610B, 620B, then the transmission frames 610B, 620B of the second wireless network 106 may overlap and/or interfere with both the reserved transmission frames 610A, 620A and the reserved retransmission frames 612A, 622A in the first wireless network 104. This overlapping and/or interference may render communication between the first wireless node 102 and the second wireless node 108 within the first wireless network 104 difficult due to the interference by the reserved transmission frames 610B, 620B within the second wireless network 106 with both the reserved transmission frames 610A, 620A and the reserved retransmission frames 612A, 622 within the first wireless network 104.

To allow communication in both the first wireless network 104 and the second wireless network 106, the first wireless node 102 may acknowledge data included in frames successfully received and/or sent during the reserved transmission slots or frames 610A, 620A in the first wireless network. The first wireless node 102 may ignore data sent or received, and may not send data or frames itself, during the reserved retransmission frames 612A, 622A to prevent interference or overlap with the reserved transmission frames 610B, 620B or reserved retransmission frames 612B, 622B in the second wireless network 106. In an example embodiment, the first wireless node 102 may send acknowledgments during the reserved transmission frames 610A, 620A in the first wireless network 104 regardless of whether the data was successfully received during the transmission frames 610A, 620A in the first wireless network 104, to prevent the second wireless node 108 from resending the data or frame during the retransmission frames 612A, 622A.

In the second wireless network 106, the first wireless node 102 may ignore data or frames sent during reserved transmission frames 610B, 620B, and may process and acknowledge frames sent and/or received during the reserved downlink transmissions included in the reserved transmission frames 612B, 622B. The first wireless node 102 may not send data during the reserved transmission frames 610B, 610B, and may send data during the reserved retransmission frames 612B, 622B. Thus, the first wireless node 102 may communicate with the second wireless node 108 within the first wireless network 104 only during the reserved transmission frames 610A, 620A, and may communicate and may communicate with the third wireless node 110 within the second wireless network 106 only during the reserved retransmission frames or slots 612B, 622B.

The above description with reference to FIG. 6 has been made with reference to the first wireless network 104 leading the second wireless network 106. If drift causes this leading by the first wireless network 104 to change, so that the second wireless network 106 begins to lead the first wireless network 104 and/or the first wireless network 104 begins to lag the second wireless network 106, then the first wireless node 102 may dynamically shift the method of selecting which of the transmission or retransmission frames via which the wireless node 102 communicates.

In this example in which the lagging has changed, which is shown by the frames 630A, 632A, 630B, 632B in the righthand side of FIG. 6, after determining that the phase or synchronization of transmitting frames in the first wireless network 104 lags the phase or synchronization of transmitting frames in the second wireless network 106, the first wireless node 102 may communicate with the third wireless node 110 in the second wireless network 106, by processing and acknowledging data or frames and sending data or frames, received during the reserved transmission frames 630B, and may ignore data and not transmit during the reserved retransmission frames 632B. The acknowledgements in the second wireless networks 106 may be sent during the reserved transmission frame 630B.

In this example, when the first wireless network 104 has begun to lag the second wireless network 106, the first wireless node 102 may communicate with the second wireless node 108 in the first wireless network 104 by ignoring the reserved transmission frames 630A, and processing and acknowledging data sent during the reserve retransmission frames 632A, and may send data only during the reserved retransmission frames 632A. Thus, after the first wireless network 104 has begun to lag the second wireless network 106, the first wireless node 102 may communicate with the second wireless node 108 in the first wireless network 104 during the reserved retransmission frame 632B and not use the reserved transmission frame 630B. The first wireless node 102 may communicate with the third wireless node 110 within the first wireless network 106 during the reserved transmission frame 630B and may not use and/or ignore data sent during the reserved retransmission frame 632B.

Returning to FIG. 2, if the first wireless node 102 determines that the third wireless node 110 does not support retransmission (220) (or if the first wireless node 102 determines that the third wireless node 110 does support retransmission (212) after determining that the second wireless node 108 does not support retransmission (204)), then the first wireless node 102 may request two retransmission slots (224) for each transmission slot and/or two retransmission frames for each transmission frame with the node 108, 110 which does support retransmission. The wireless node 102 may request two transmission slots or frames in the situation in which one of the second wireless node 108 and the second wireless node 110 supports retransmission and/or eSCO but the other wireless node 108, 110 does not support retransmission and/or eSCO. This may occur after it has been determined that the second wireless node 108 does support retransmission 204 but the third wireless node 110 does not support retransmission 220 and/or after determining that the second wireless node 108 does not support retransmission 204 but the third wireless node 110 does support retransmission (212).

Figure 7:
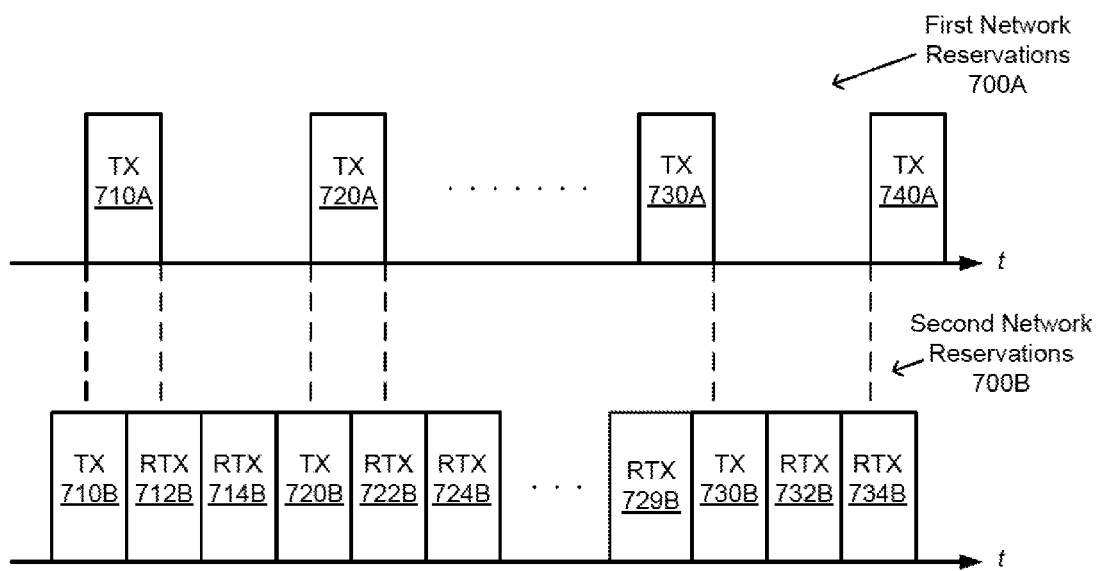
FIG. 7 is a diagram showing reserved transmission frames in the first wireless network and reserved transmission frames and reserved retransmission frames in the second wireless network according to an example embodiment.

FIG. 7 is a diagram showing reserved transmission frames 710A, 710B, 730A, 740A in the first wireless network 104 and reserved transmission frames 710B, 720B, 730B and reserved retransmission frames 712B, 714B, 722B, 724B, 729B, 732B, 734B in the second wireless network 106 according to an example embodiment. In this example, the third wireless node 110 in the second wireless network 106 supports retransmission, but the second wireless node 108 in the first wireless network 104 does not support retransmission. Also in this example, the first wireless node 102 may be a slave to the second wireless node 108 in the first wireless network 104, and the second wireless node 102 may be a slave to the third wireless node 110 in the second wireless network 106. Thus, the first wireless node 102, second wireless node 108, and third wireless node 110 may alternatively be referred to as a "slave node," a "first master node," and a "second master node," respectively.

In this example, the reserved frames 700A in the first network 104 shown in the top of FIG. 7 may be considered reserved frames in the first network 104 which does not support retransmission. The reserved frames 700B in the second network 106 shown in the bottom of FIG. 7 may be frames transmitted within the second wireless network 106. Frames which are not reserved in either the first network 104 or the second network 106 are not shown in FIG. 7.

The first wireless node 102 may have negotiated two retransmission frames or slots for every transmission slot with the third wireless node 110 in the second wireless network 106 as described above with reference to FIGS. 2 and 3. This negotiation may have occurred during pairing or after pairing, according to example embodiments. In an example in which the first wireless network 104 lags the second wireless network 106, the transmission frames 710A, 720A in the first wireless network 104 may overlap with and/or interfere with both the transmission frames 710B, 720B and the first retransmission frames 712B, 722B of the second wireless network 106. The reserved transmission frames 710A, 720A in the first wireless network 104 may each overlap with and/or interfere with a reserved transmission frame 710B, 720B in the second wireless network.

In this example, the first wireless node 102 may receive, process, and acknowledge frames and/or data received from the second wireless node 108 within the first wireless network 104 during the reserved transmission frame 710A, 720A. Also in this example, the first wireless node 102 may ignore frames or data transmitted by the third wireless node 110 within the second wireless network 106 during the reserved transmission frames 710B, 720B, and first reserved retransmission frames 712B, 722B (which immediately follow the reserved transmission frames 710B, 720B). The first wireless node 102 may process and acknowledge frames or data sent, and may send data, during second retransmission frames or slots 714B, 724B (which immediately follow the first reserved retransmission frames 712B, 722B). Thus, the first wireless node 102 may communicate with the second wireless node 108 within the first wireless network 104 during the reserved transmission frames 710A, 720A, and the first wireless node 102 may communicate with the third wireless node 110 within the second wireless network 106 only during the second reserved retransmission frames 714B, 724B.

If the first wireless node 102 determines that the first wireless network 104 (which does not support retransmission) leads the second wireless network 106, either initially or after previously determining the first wireless network 104 lags the second wireless network 106 and making the changes to communication described above, the first wireless node 102 may communicate with the second wireless node 108 within the first wireless network 104 during the reserved transmission frames 730A, 730B, such as by receiving and acknowledging frames or data sent, and sending data during, reserved transmission frames 730A, 740A in the first wireless network 104. The first wireless node 102 may communicate with the third wireless node 110 within the second wireless network 106 only during the first reserved retransmission frame 732B, and may ignore frames or data sent during the reserved transmission frame 730B and second retransmission frame 734B in the second wireless network 106, in the example in which the first wireless network 104 leads the second wireless network 106.

In this example in which the first wireless network 104, which does not support retransmission, leads the second wireless network 106, which does support retransmission, the first wireless node 102 may acknowledge frames received from the third wireless node 110 during the first reserved retransmission frame 732B based on determining that the phase or synchronization of the first wireless network 104 leads the phase or synchronization of the second wireless network 106, and/or based on determining that the reserved transmission frames 730A, 740A in the first wireless network 104 interfere or overlap with both the reserved transmission frame 730B and the second reserved retransmission frame 729B, 734B in the second wireless network 106. Thus, in this example in which the first wireless network 104 leads the second wireless network 106, the first wireless node 102 may communicate with the second wireless node 108 during the reserve transmission frames 730A, 740A within the first wireless network 104, and the first wireless node 102 may communicate with the third wireless node 110 within the second wireless network 106 during the first retransmission frames 732B immediately following the transmission frames 730B. The transmission frames 730B and second retransmission frames 734B within the second wireless network 106 may not be used by the first wireless node 102, thereby avoiding interference between the first wireless network 104 and the second wireless network 106.

Figure 8:
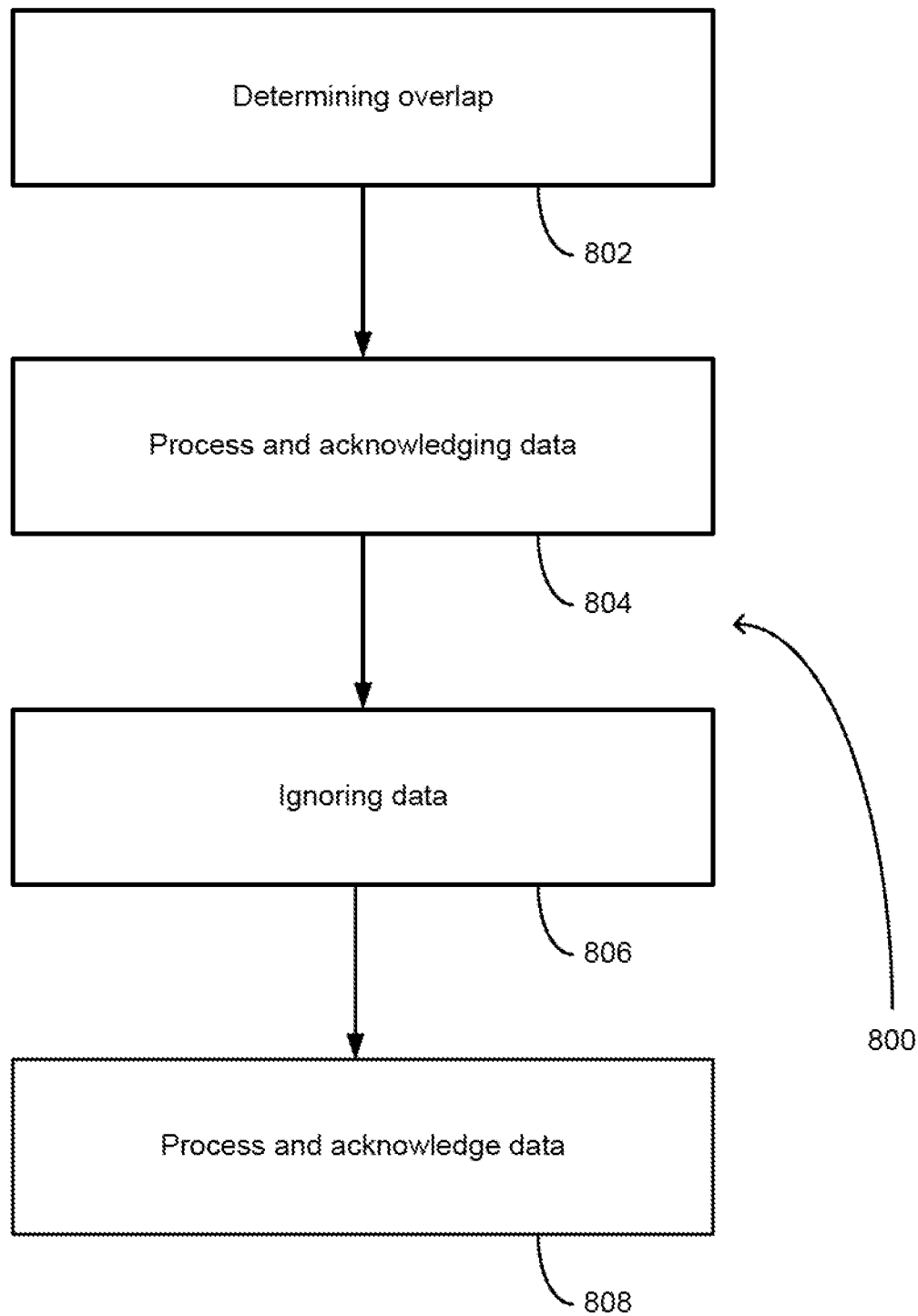
FIG. 8 is a flowchart showing a method according to an example embodiment.

FIG. 8 is a flowchart showing a method 800 according to an example embodiment. In this example, the method 800 may include determining, by a wireless node 102 wirelessly coupled to a first master node 108 and a second master node 110, that a first reserved retransmission frame 612A, 622A overlaps with a second reserved transmission frame 610B, 620B and a second reserved retransmission frame 612B, 622B, and that the second reserved transmission frame 610B, 620B overlaps with a first reserved transmission frame 610A, 620A and the first reserved retransmission frame 612A, 622A (802). The first reserved transmission frame 610A, 620A and the first reserved retransmission frame 612A, 622A may be reserved for wireless communication with the first master node 108 within the first wireless network 104 or piconet. The second reserved transmission frame 610B, 620B and the second reserved retransmission frame 612B, 622B may be reserved for wireless communication with the second master node 110 within the second wireless network 106 or piconet. The method 800 may also include processing and acknowledging data received from the first master node 108 during the first reserved transmission frame 610A, 620A based on the determining (804). The method 800 may also include ignoring data sent by the second master node 110 during the second reserved transmission frame 610B, 620B based on the determining (806). The method 800 may also include processing and acknowledging data received from the second master node 110 during the second reserved retransmission frame 612B, 622B based on the determining.

In an example embodiment, the first master node 108 may comprise a first IEEE 802.15 Bluetooth master node 108 and the second master node 110 may comprise a second IEEE 802.15 Bluetooth master node 110.

In an example embodiment, the first master node 108 may include a first Extended Synchronous Connections (eSCO) master node 108, and the second master node 110 may include a second eSCO master node 110.

In an example embodiment, the first reserved retransmission frame 612A, 622A may immediately follow the first reserved transmission frame 610A, 620A, and the second reserved retransmission frame 612B, 622B may immediately follow the second reserved transmission frame 610B, 620B.

In an example embodiment, the method 800 may further include pairing, by the wireless node 102, with the first master node 108, the pairing with the first master node 108 comprising the wireless node 102 unsuccessfully requesting to be master of the first master node 108. The method 800 may also include pairing, by the wireless node 102, with the second master node 110, the pairing with the second master node 110 comprising the wireless node 102 unsuccessfully requesting to be master of the second master node 110.

In an example embodiment, the method 800 may further include subsequently determining that the first reserved transmission frame 630A overlaps with the second reserved transmission frame 630B and the second reserved retransmission frame 632B, and that the second reserved retransmission frame 632B overlaps with the first reserved transmission frame 630A and the first reserved retransmission frame 632A. The method 800 may also include ignoring data sent by the first master node 108 during the first reserved transmission frame 630A based on the subsequent determining, processing and acknowledging data received from the first master node 108 during the first reserved retransmission frame 632A based on the subsequent determining, and processing and acknowledging data received from the second master node 110 during the second reserved transmission frame 630B based on the subsequent determining.

In an example embodiment, the method 800 may further include requesting, by the wireless node 102, to be master when pairing with wireless nodes which do not support reserved retransmission frames.

In an example embodiment, the method 800 may further include determining that each frame (e.g., comprising slots 410A, 411A, 420A, 421A) via which the wireless node 102 communicates with a slave node, of which the wireless node is master, overlaps with two frames (such as the frames comprising the slots 410B, 411B, 420B, 421B and their respective preceding frames) via which the wireless node 102 communications with a third master node. The method 800 may also include drifting frame synchronization with the slave node until each frame (e.g. comprising slots 430A, 431A) via which the wireless node 102 communicates with the slave node overlaps with only one frame (e.g. comprising slots 430B, 431B) via which the wireless node 102 communicates with the third master node, based on the determining that each frame via which the wireless node 102 communicates with the slave node overlaps with two frames via which the wireless node 102 communications with the third master node.

In an example embodiment, the method 800 may further include requesting, by the wireless node 102, to be master when pairing with a second wireless node which does not support reserved retransmission frames, determining that each frame (e.g., comprising slots 410A, 411A, 420A, 421A) via which the wireless node 102 communicates with a slave node, of which the wireless node is master, overlaps with two frames (such as the frames comprising the slots 410B, 411B, 420B, 421B and their respective preceding frames which are not shown in FIG. 5) via which the wireless node 102 communications with a third master node. The method 800 may also include drifting frame synchronization with the slave node until each frame (e.g. comprising slots 430A, 431A) via which the wireless node 102 communicates with the slave node overlaps with only one frame (e.g. comprising slots 430B, 431B) via which the wireless node 102 communicates with the third master node, based on the determining that each frame via which the wireless node 102 communicates with the slave node overlaps with two frames via which the wireless node 102 communications with the third master node.

Figure 9:
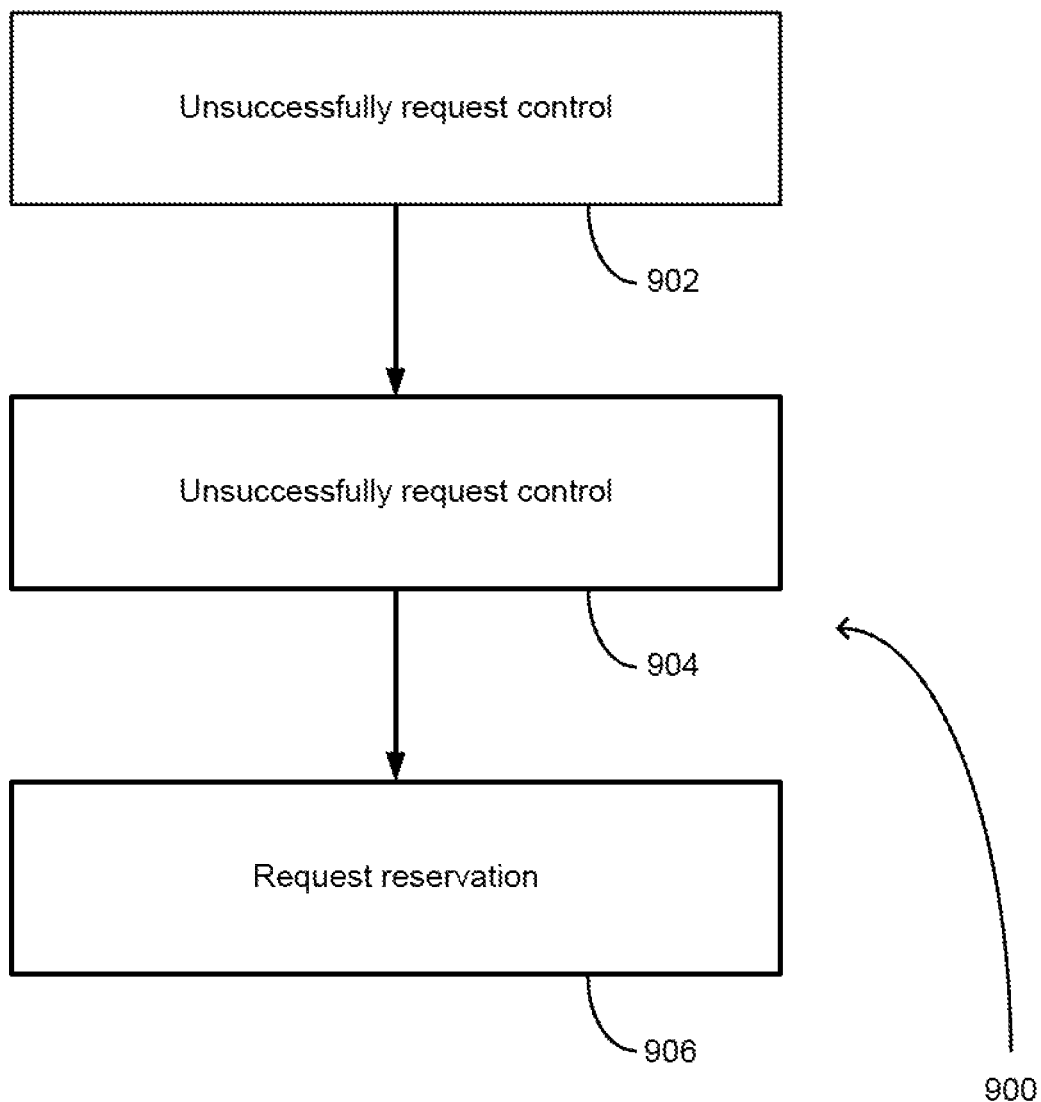
FIG. 9 is a flowchart showing a method according to another example embodiment.

FIG. 9 is a flowchart showing a method 900 according to an example embodiment. In this example, the method 900 may include unsuccessfully requesting to control a synchronization of transmissions between the first wireless node 102 and a second wireless node 108, the second wireless node 108 not supporting reserved retransmission frames (206, 902). The unsuccessfully request may include, for example a request to be master or a role switch request which is denied by the second wireless node 108. The method 900 may also include unsuccessfully requesting to control a synchronization of transmissions between the first wireless node 102 and a third wireless node 110 (904). The method 900 may also include requesting reservation of at least two reserved retransmission frames 710B, 714B, 722B, 724B, 732B, 734B for every reserved transmission frame 710B, 720B, 730B during communications between the first wireless node 102 and the third wireless node 110 (224, 906). The wireless node 102 may request the reservation being based at least in part on the second wireless node 108 not supporting reserved retransmission frames, the unsuccessful request to control synchronization between the first wireless node 102 and the second wireless node 108, and the unsuccessful request to control the synchronization between the first wireless node 102 and the third wireless node 110.

In an example embodiment, the first wireless node 102 may comprise a first IEEE 802.15 Bluetooth node 102, the second wireless node 108 may comprise a second IEEE 802.15 Bluetooth node 108, and the third wireless node 110 may comprise a third IEEE 802.15 Bluetooth node 110.

In an example embodiment, the first and third wireless nodes 102, 110 may include Extended Synchronous Connections (eSCO) nodes 102, 110, and the second wireless node 108 may include a Synchronous Connection (SCO) node 108.

In an example embodiment, the method 900 may include the wireless node 102 ignoring data transmitted during the reserved transmission frame 710B, 720B and a first reserved retransmission frame 712B, 722B during communication with the third wireless node 110. The method 900 may also include processing and acknowledging data received during a second or subsequent reserved retransmission frame 714B, 724B during communication with the third wireless node 110.

In an example embodiment, the method 900 may also include the wireless node 102 requesting to be master when pairing with a wireless node which does not support reserved retransmission frames.

In an example embodiment, the method 900 may also include determining that single frames (e.g., frames including slots 410A, 411A, 420A, 421A) for communication with a fourth wireless node, of which the wireless node 102 is master, overlap with two frames (e.g., frames including slots 410B, 411B, 420B, 421B and their preceding frames which are not shown in FIG. 5) for communication with a fifth wireless node of which the wireless node 102 is slave. The method 900 may also include shifting synchronization of the frames for communication with the fourth wireless node until the single frames (e.g., a frame including slots 430A, 431A) for communication with the fourth wireless node each overlap with a single frame (e.g., a frame including slots 430B, 431B) for communication with the fifth wireless node, based on the determining that the single frames for communication with a fourth wireless node overlap with two frames for communication with a fifth wireless node.

In an example embodiment, the method 900 may further include the wireless node 102 requesting to be master when pairing with a fourth wireless node which does not support reserved retransmission frames. The method 900 may also include determining that single frames (e.g., frames including slots 410A, 411A, 420A, 421A) for communication with a fourth wireless node, of which the wireless node 102 is master, overlap with two frames (e.g., frames including slots 410B, 411B, 420B, 421B and their preceding frames which are not shown in FIG. 5) for communication with a fifth wireless node of which the wireless node 102 is slave. The method 900 may also include shifting synchronization of the frames for communication with the fourth wireless node until the single frames (e.g., a frame including slots 430A, 431A) for communication with the fourth wireless node each overlap with a single frame (e.g., a frame including slots 430B, 431B) for communication with the fifth wireless node, based on the determining that the single frames for communication with a fourth wireless node overlap with two frames for communication with a fifth wireless node.

Figure 10:
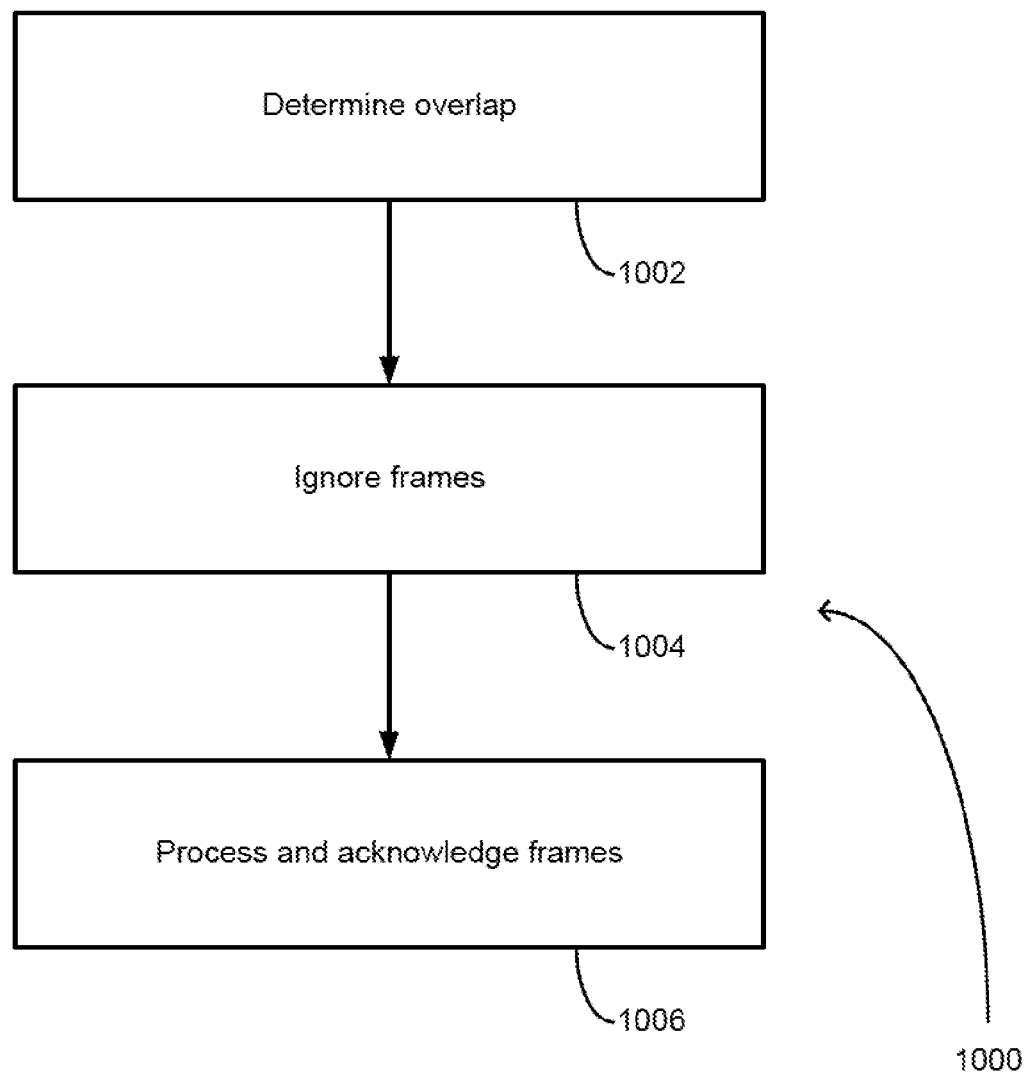
FIG. 10 is a flowchart showing a method according to another example embodiment.

FIG. 10 is a flowchart showing a method 1000 according to an example embodiment. In this example, the method 1000 may include determining that a second wireless node 108 does not support retransmission of unsuccessfully received frames (204), that transmission frames 710A, 720A reserved for communication with the second wireless node 108 overlap with reserved transmission frames 710B, 720B and first reserved retransmission frames 712B, 720B for communication with a third wireless node 110, and that the third wireless node 110 supports at least two reserved retransmission frames 712B, 714B, 722B, 724B for each reserved transmission frame 710B, 720B (212) (1002). The method 1000 may also include ignoring frames transmitted by the third wireless node 110 during the reserved transmission frame 710B, 720B and the first retransmission frame 712B, 722B for communication with the third wireless node 110 based on the determining (1004). The method 1000 may also include processing and acknowledging frames received from the third wireless node 110 during a second or subsequent retransmission frame 714B, 724B based on the determining (1006).

In an example embodiment, the first wireless node 102 may comprises a first IEEE 802.15 Bluetooth node 102, the second wireless node 108 may comprise a second IEEE 802.15 Bluetooth node 108, and the third wireless node 110 may comprise a third IEEE 802.15 Bluetooth node 110.

In an example embodiment, the method 1000 may also include processing and acknowledging frames received from the second wireless node 108 during the transmission frames 710A, 720A reserved for communication with the second wireless node.

In an example embodiment, the method 1000 may also include determining that the transmission frames 730A, 740A reserved for communication with the second wireless node 108 overlap with the second reserved retransmission frames 729B, 734B and the reserved transmission frames 730B for communication with the third wireless node 110. The method 1000 may also include ignore frames transmitted during the second retransmission frame 729B, 734B and the transmission frame 730B reserved for the third wireless node 110 based on the determining that the transmission frames 730A, 740A reserved for communication with the second wireless node 108 overlap with the second reserved retransmission frames 729B, 734B and the reserved transmission frames 730B for communication with the third wireless node 110. The method 1000 may also include processing and acknowledging frames received during the first retransmission frame 732B reserved for communication with the third wireless node 110 based on the determining that the transmission frames 730A, 740A reserved for communication with the second wireless node 108 overlap with the second reserved retransmission frames 729B, 734B and the reserved transmission frames 730B for communication with the third wireless node 110.

In an example embodiment, the method 1000 may also include the wireless node 102 requesting to be master when pairing with a wireless node 108 which does not support reserved retransmission frames (206).

In an example embodiment, the method 1000 may also include the wireless node 102 determining that single frames (e.g., frames which include slots 410A, 411A, 420A, 421A) for communication with a fourth wireless node, of which the wireless node 102 is master, overlap with two frames (e.g., frames which include slots 410B, 411B, 420B, 421B, and their preceding frames which are not shown in FIG. 5) for communication with a fifth wireless node of which the wireless node 102 is slave. The method 1000 may also include shifting synchronization of the frames for communication with the fourth wireless node until the single frames (e.g., frames which include slots 430A, 431A) for communication with the fourth wireless node each overlap with a single frame (e.g., frames which include slots 430B, 431B) for communication with the fifth wireless node, based on the determining that the single frames for communication with a fourth wireless node overlap with two frames for communication with a fifth wireless node.

In an example embodiment, the method 1000 may also include the wireless node 102 requesting to be master when pairing with a fourth wireless node which does not support reserved retransmission frames (208). The method 1000 may also include determining that single frames (e.g., frames which include slots 410A, 411A, 420A, 421A) for communication with a fourth wireless node, of which the wireless node 102 is master, overlap with two frames (e.g., frames which include slots 410B, 411B, 420B, 421B, and their preceding frames which are not shown in FIG. 5) for communication with a fifth wireless node of which the wireless node 102 is slave. The method 1000 may also include shifting synchronization of the frames for communication with the fourth wireless node until the single frames (e.g., frames which include slots 430A, 431A) for communication with the fourth wireless node each overlap with a single frame (e.g., frames which include slots 430B, 431B) for communication with the fifth wireless node, based on the determining that the single frames for communication with a fourth wireless node overlap with two frames for communication with a fifth wireless node.

FIG. 1 is a block diagram of a wireless station node 1100 according to an example embodiment. The wireless station 1100 (e.g., wireless node 102, 108, 110) may include, for example, an RF (radio frequency) or wireless transceiver 1102, including a transmitter to transmit signals and a receiver to receive signals, a processor 1104 to execute instructions or software and control transmission and receptions of signals, and a memory 706 to store data and/or instructions.

Processor 1104 may also make decisions or determinations, generate frames or messages for transmission, decode received frames or messages for further processing, and other tasks or functions described herein. Processor 1104, which may be a baseband processor, for example, may generate messages, packets, frames or other signals (such as those described above) for transmission via wireless transceiver 1102. Processor 1104 may control transmission of signals or messages over a wireless network, and may receive signals or messages, etc., via a wireless network (e.g., after being down-converted by wireless transceiver 1102, for example). Processor 1104 may be programmable and capable of executing software or other instructions stored in memory or on other computer media to perform the various tasks and functions described above, such as one or more of the tasks or methods described above. Processor 1104 may be (or may include), for example, hardware, programmable logic, a programmable processor that executes software or firmware, and/or any combination of these. Using other terminology, processor 1104 and transceiver 1102 together may be considered as a wireless transmitter/receiver system, for example.

Figure 11:
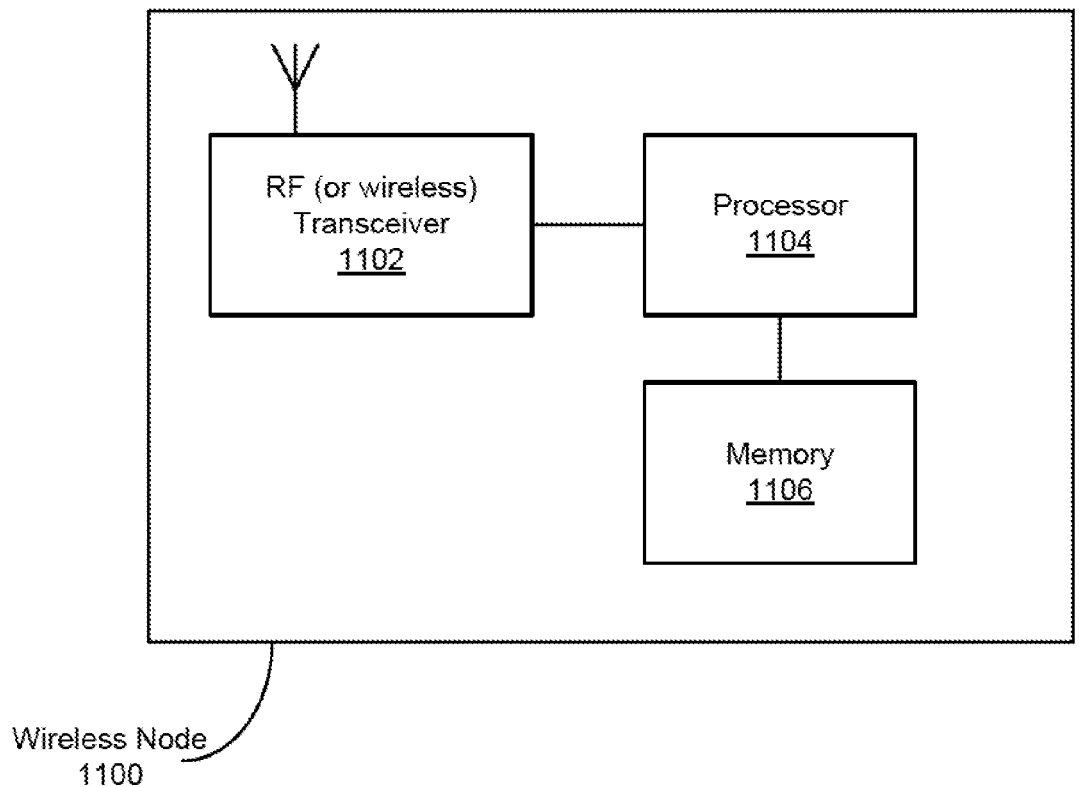
FIG. 11 is a block diagram showing a wireless node according to an example embodiment.

In addition, referring to FIG. 11, a controller (or processor) 1108 may execute software and instructions, and may provide overall control for the station 1100, and may provide control for other systems not shown in FIG. 11, such as controlling input/output devices (e.g., display, keypad), and/or may execute software for one or more applications that may be provided on wireless station 1100, such as, for example, an email program, audio/video applications, a word processor, a Voice over IP application, or other application or software.

In addition, a storage medium such as the memory 1106 may be provided that includes stored instructions, which when executed by a controller or processor may result in the processor 1104, or other controller or processor, and/or the wireless node 1100 performing one or more of the functions or tasks described above.

Implementations of the various techniques described herein may be implemented in digital electronic circuitry, or in computer hardware, firmware, software, or in combinations of them. Implementations may implemented as a computer program product, i.e., a computer program tangibly embodied in an information carrier, e.g., in a machine-readable storage device, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the true spirit of the embodiments of the invention.

What is claimed is:

1. A device comprising:
at least one processor circuit configured to:
control synchronization of at least one of a first communications with a first device or a second communications with a second device when the synchronization of the at least one of the first or second communications can be controlled; and
request at least two retransmission frames for every transmission frame of the first communications with the first device when the synchronization of the at least one of the first or second communications cannot be controlled.

2. The device of claim 1, wherein a first retransmission frame of the first communications immediately follows a first transmission frame of the first communications and a second retransmission frame of the first communications immediately follows the first retransmission frame.

3. The device of claim 2, wherein the at least one processor circuit is further configured to:
determine that the second communications with the second device interfere with two of the transmission frame, the first retransmission frame, or the second retransmission frame, and do not interfere with one of the transmission frame, the first retransmission frame, or the second retransmission frame;
ignore the two of the transmission frame, the first retransmission frame, and the second retransmission frame that the second communications interfere with; and
process and acknowledge the one of the transmission frame, the first retransmission frame, or the second retransmission frame that the second communications do not interfere with.

4. The device of claim 1, wherein when the synchronization of the at least one of the first or second communications can be controlled, the at least one processor circuit is configured to:
determine that a first single frame for the second communications with the second device, for which the synchronization can be controlled, overlaps with two frames for the first communications with the first device for which the synchronization cannot be controlled; and
shift the synchronization of the second communications with the second device until the first single frame for the second communications with the second device overlaps only one of the two frames for the first communications with the first device.

5. The device of claim 1, wherein when the synchronization of the at least one of the first or second communications can be controlled, the at least one processor circuit is configured to:
control at least one of a phase or a timing of the at least one of the first communications with the first device or the second communications with the second device.

6. The device of claim 1, wherein the first device supports retransmission frames and the second device does not support the retransmission frames.

7. The device of claim 1, wherein the at least one processor circuit is further configured to:
request to control the synchronization of the first communications with the first device and the second communications with the second device; and
determine, based at least in part on a response to the requesting, whether the synchronization of the at least one of the first or second communications can be controlled.

8. The device of claim 7, wherein the at least one processor circuit is further configured to:
pair with the first device, the pairing with the first device comprising the requesting to control the synchronization of the first communications with the first device; and
pair with the second device, the pairing with the second device comprising the requesting to control the synchronization of the second communications with the second device.

9. The device of claim 1, wherein the at least two retransmission frames of the first communications comprise reserved retransmission frames and every transmission frame of the first communications comprises a reserved transmission frame.

10. The device of claim 1, wherein the at least two retransmission frames are used for retransmitting data which was not acknowledged.

11. A method comprising:
determining whether synchronization of at least one of a first communications with a first device or second communications with a second device can be controlled;
controlling the synchronization of the first communications or the second communications so that a transmission frame of the first communications overlaps only one transmission frame of the second communications when the synchronization can be controlled; and requesting at least two retransmission frames for every second transmission frame of the second communications with the second device when the synchronization of at least one of the first or second communications cannot be controlled.

12. The method of claim 11, wherein the first device does not support retransmission frames and the second device supports the retransmission frames.

13. The method of claim 11, further comprising:
requesting to control the synchronization of the first communications with the first device and the second communications with the second device; and
determining, based at least in part on a response to the requesting, whether the synchronization of the at least one of the first or second communications can be controlled.

14. The method of claim 13, further comprising:
pairing with the first device, the pairing with the first device comprising the requesting to control the synchronization of the first communications with the first device; and
pairing with the second device, the pairing with the second device comprising the requesting to control the synchronization of the second communications with the second device.

15. The method of claim 11, wherein the retransmission frames comprise reserved retransmission frames and the transmission frames comprise reserved transmission frames.

16. The method of claim 11, wherein a first retransmission frame of the second communications immediately follows a first transmission frame of the second communications and a second retransmission frame of the second communications immediately follows the first retransmission frame.

17. The method of claim 16, further comprising:
determining that the first communications with the first device overlap with two of the transmission frame, the first retransmission frame, or the second retransmission frame, and do not overlap with one of the transmission frame, the first retransmission frame, or the second retransmission frame;
ignoring the two of the transmission frame, the first retransmission frame, and the second retransmission frame that the first communications overlap with; and
processing and acknowledging the one of the transmission frame, the first retransmission frame, or the second retransmission frame that the first communications do not overlap with.

18. The method of claim 11, wherein the controlling the synchronization of the at least one of the first communications with the first device or the second communications with the second device further comprises:
controlling at least one of a phase or a timing of the at least one of the first communications with the first device or the second communications with the second device.

19. A computer program product comprising instructions stored in a non-transitory computer-readable storage medium, the instructions comprising:
instructions to determine whether timing of at least one of a first communications with a first device or a second communications with a second device can be controlled;
instructions to control the timing of the at least one of the first communications or the second communications when the timing can be controlled; and
instructions to request at least two retransmission frames for every transmission frame of the first communications with the first device when the timing of the at least one of the first or second communications cannot be controlled.

20. The computer program product of claim 19, wherein the first device supports retransmission frames and the second device does not support the retransmission frames.

* * * * *